US009715949B2

(12) United States Patent
Taguchi et al.

(10) Patent No.: US 9,715,949 B2
(45) Date of Patent: Jul. 25, 2017

(54) RADIATION MONITOR

(71) Applicant: Mitsubishi Electric Corporation, Chiyoda-ku, Tokyo (JP)

(72) Inventors: Masaki Taguchi, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 139 days.

(21) Appl. No.: 14/884,177

(22) Filed: Oct. 15, 2015

(65) Prior Publication Data

US 2016/0349385 A1 Dec. 1, 2016

(30) Foreign Application Priority Data

May 29, 2015 (JP) ................................ 2015-109458

(51) Int. Cl.
*G21C 17/112* (2006.01)
*G21C 17/00* (2006.01)
*G21D 3/06* (2006.01)

(52) U.S. Cl.
CPC ............ *G21C 17/112* (2013.01); *G21C 17/00* (2013.01); *G21D 3/06* (2013.01)

(58) Field of Classification Search
CPC .................................................... G21C 17/112
See application file for complete search history.

(56) References Cited

U.S. PATENT DOCUMENTS 3,567,942 A * 3/1971 Bach ...................... G01N 23/16 220/89.4
3,697,755 A * 10/1972 Boissevain ............... G21F 5/02 250/496.1
4,580,053 A * 4/1986 Snyder ................ G01N 23/203 250/358.1
4,916,322 A * 4/1990 Glavish ................ G03F 7/7055 250/492.2

FOREIGN PATENT DOCUMENTS

JP 2010-078319 A 4/2010
JP 2011-252873 A 12/2011

* cited by examiner

*Primary Examiner* — David J Makiya
*Assistant Examiner* — Dani Fox
(74) *Attorney, Agent, or Firm* — Buchanan Ingersoll & Rooney PC

(57) ABSTRACT

The radiation monitor includes: a shutter; a calculation section; an AC solenoid; a temperature switch which is attached to the AC solenoid; a circuit protector which has a contact and is connected in series to the AC solenoid; and a mode selection switch connected in series to the AC solenoid. The shutter is maintained in a closed state when the mode selection switch is set to a normal mode; the mode selection switch is changed from the normal mode to a check radiation source mode, thereby flowing an AC current through the AC solenoid to change the shutter from the closed state to an opened state; and the contact of the temperature switch is reversed from the opened state to the closed state, thereby disconnecting the contact of the circuit protector to interrupt the AC current that flows through the AC solenoid.

12 Claims, 8 Drawing Sheets

100
1 15 2 21 22 23 31 Signal Processing Section Calculation Section Display Section 32 26 24 25 11 14 125 126 122 121 129 12 127 128 3

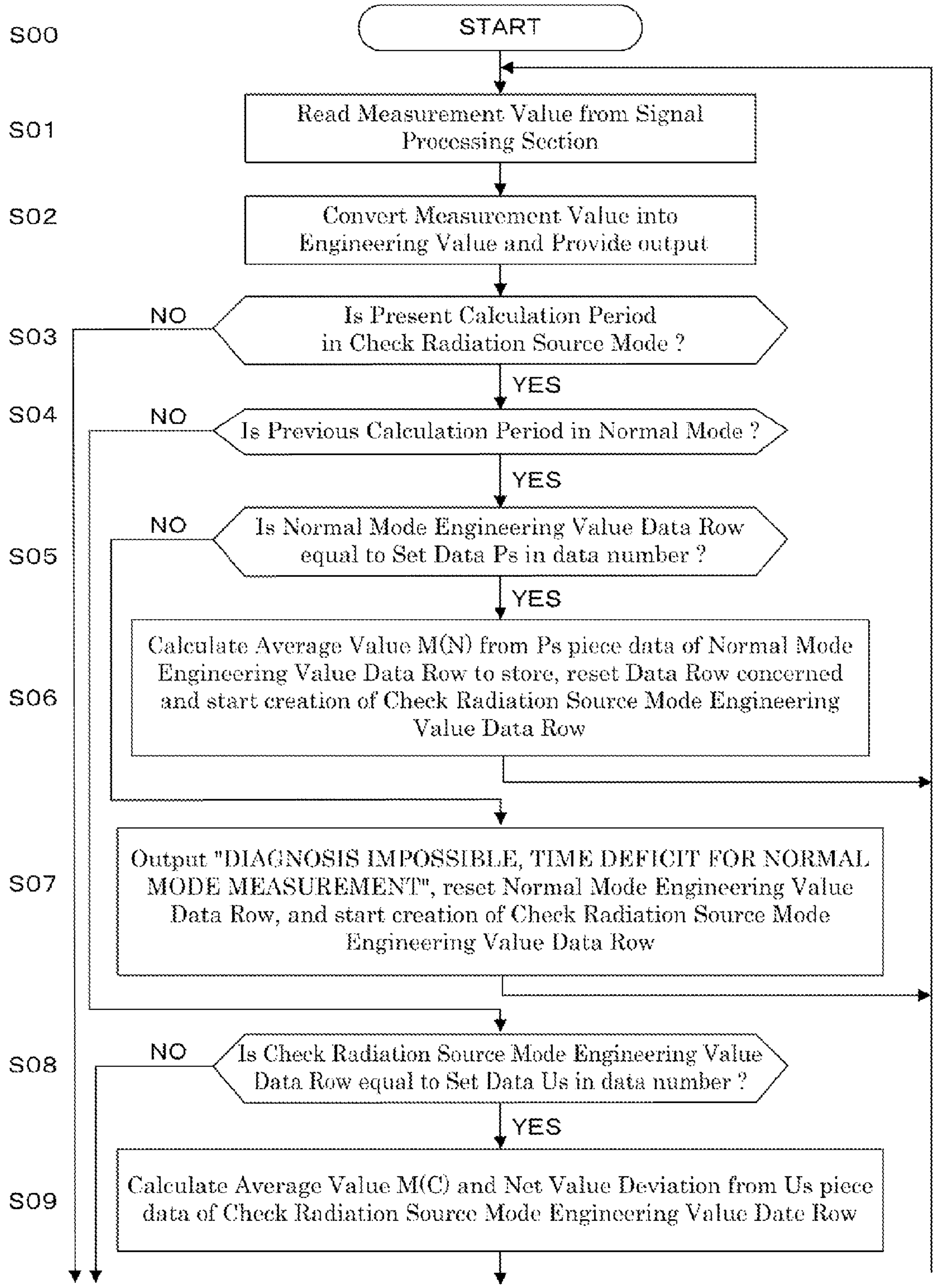
Figure 7
S00
START
S01
Read Measurement Value from Signal Processing Section
S02
Convert Measurement Value into Engineering Value and Provide output
S03
NO
Is Present Calculation Period in Check Radiation Source Mode ?
YES
S04
NO
Is Previous Calculation Period in Normal Mode ?
YES
S05
NO
Is Normal Mode Engineering Value Data Row equal to Set Data Ps in data number ?
YES
S06
Calculate Average Value M(N) from Ps piece data of Normal Mode Engineering Value Data Row to store, reset Data Row concerned and start creation of Check Radiation Source Mode Engineering Value Data Row
S07
Output "DIAGNOSIS IMPOSSIBLE, TIME DEFICIT FOR NORMAL MODE MEASUREMENT", reset Normal Mode Engineering Value Data Row, and start creation of Check Radiation Source Mode Engineering Value Data Row
S08
NO
Is Check Radiation Source Mode Engineering Value Data Row equal to Set Data Us in data number ?
YES
S09
Calculate Average Value M(C) and Net Value Deviation from Us piece data of Check Radiation Source Mode Engineering Value Date Row

RADIATION MONITOR

TECHNICAL FIELD

The present invention relates to radiation monitors and, more particularly, relates to a radiation monitor provided with a normal mode and a check radiation source mode.

BACKGROUND ART

A radiation monitor which includes a detection unit and a measurement unit and can select between a normal mode and a check radiation source mode is installed in nuclear reactor facilities, spent fuel reprocessing facilities, and the like (for example, see Patent Documents 1 and 2). The detection unit of the radiation monitor is equipped with: a radiation detector which detects radiation and outputs a detection signal; and a check radiation source irradiation section which irradiates radiation for inspection to the radiation detector by remote operation. The check radiation source irradiation section includes an AC solenoid.

A signal processing section, a calculation section, a mode selection switch, and a circuit protector are installed in the measurement unit of the radiation monitor. The signal processing section measures the radiation by being inputted with the detection signal outputted from the radiation detector. The calculation section converts a measurement value thereof into an engineering value as a radiation dose per unit time and provides an output. A display section displays the engineering value.

The mode selection switch performs selective operation between the normal mode in which normal measurement is performed and the check radiation source mode in which measurement is performed in a state where the radiation for inspection is irradiated to the radiation detector. If the AC solenoid of the check radiation source irradiation section exceeds a set current value, the circuit protector trips a contact thereof to interrupt the current of the AC solenoid by time delay characteristics depending on the size of the current value and mechanically self-maintains its contact state.

"Japan Electric Association Guide (JEAG) 4606-2003, Guideline for radiation monitoring of nuclear power plants" is defined as Japanese domestic guidelines relating to the radiation monitor. When the check radiation source mode is selected, the check radiation source is irradiated to the radiation detector to confirm soundness of the radiation monitor based on the guideline. When there occurs abnormality in the AC solenoid of the check radiation source irradiation section and accordingly an overcurrent flows, the current is interrupted by the circuit protector to protect the radiation detector.

PRIOR ART DOCUMENT

Patent Document

[Patent Document 1] JP-A-2011-252873
[Patent Document 2] JP-A-2010-78319

SUMMARY OF THE INVENTION

Problems to be Solved by the Invention

During a normal inspection of the radiation monitor, an operation that confirms soundness, more particularly, soundness of the radiation detector is performed. Even in a state where there occurs a fault in the nuclear reactor facilities and the environmental temperature of the detection unit becomes a high temperature, as in the inspection during the normal time, the soundness of the radiation monitor, more particularly, the soundness of the radiation detector needs to be confirmed.

When the check radiation source mode is selected during a fault, an environmental temperature rise due to the fault is added to a normal temperature rise of the check radiation source irradiation section; and thus, it is assumed that the AC solenoid exceeds a rated temperature and is to be burned out. If the influence of the burnout is large, there continues a state where the radiation of the check radiation source is incompletely irradiated to the radiation detector; and accordingly, the normal mode cannot be restored in the worst case.

The present invention has been made to solve the above described problem, and an object of the present invention is to provide a highly reliable radiation monitor which surely prevents burnout of a check radiation source irradiation section even under circumstances during a fault.

Means for Solving the Problems

According to the present invention, there is provided a radiation monitor including: a shutter installed between a check radiation source and a radiation detector; a calculation section which calculates a radiation dose from a detection signal outputted by the radiation detector; an AC solenoid to be operated by an AC power source; a temperature switch which is attached to the AC solenoid and whose contact is reversed from an opened state to a closed state when temperature thereof is equal to or more than a set value; a circuit protector which has a contact and is connected in series to the AC solenoid; and a mode selection switch connected in series to the AC solenoid. In the radiation monitor, the shutter is maintained in a closed state when the mode selection switch is set to a normal mode; the mode selection switch is changed from the normal mode to a check radiation source mode, thereby flowing an AC current through the AC solenoid to change the shutter from the closed state to an opened state; and the contact of the temperature switch is reversed from the opened state to the closed state, thereby disconnecting the contact of the circuit protector to interrupt the AC current that flows through the AC solenoid.

Advantageous Effect of the Invention

According to the radiation monitor according to the present invention, there can be provided a highly reliable radiation monitor which surely prevents a check radiation source irradiation section from burning out even under circumstances during a fault.

BRIEF DESCRIPTION OF THE DRAWINGS

FIG. 7 is a chart showing ST00 to ST09 of operational flows according to Embodiment 5.

MODE FOR CARRYING OUT THE INVENTION

Figure 1:
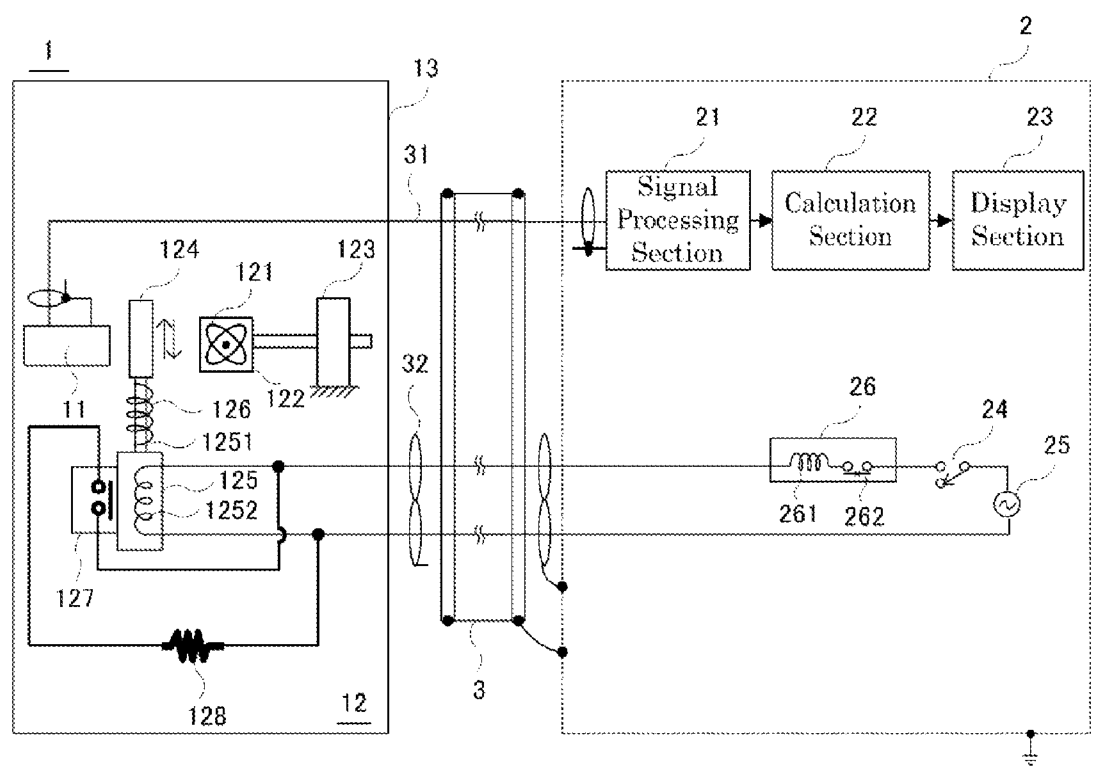
FIG. 1 is a block diagram showing a radiation monitor according to Embodiment 1 of the present invention.

Radiation monitors according to embodiments of the present invention will be described below with reference to drawings. Incidentally, the same reference numerals/characters are given to those identical or equivalent to constitutional portions in the respective drawings and the size and/or the scale size of the corresponding respective constitutional portions are respectively independent. For example, in the case of illustrating the same unchanged constitutional portions between sectional views in which a part of the configuration is changed, the size and/or the scale size of the same constitutional portions may be different. Furthermore, actually, there includes a further plurality of members in the configuration of the radiation monitor; however, for simplicity of explanation, only portions necessary for explanation are described and other portions are omitted.

Embodiment 1

Hereinafter, Embodiment 1 of the present invention will be described with reference to drawings. In FIG. 1, a radiation monitor 100 includes a detection unit 1 and a measurement unit 2. The detection unit 1 includes a radiation detector 11, a check radiation source irradiation section 12, and a detection unit cover 13. The radiation detector 11 detects radiation and outputs a detection signal. The check radiation source irradiation section 12 irradiates radiation for check to the radiation detector 11 during an inspection. The detection unit cover 13 electrically shields and protects the radiation detector 11 and the check radiation source irradiation section 12 from circumstances.

In the case of measuring environmental radiation, there can be applied a Si-PIN semiconductor detector as the radiation detector 11, the Si-PIN semiconductor detector having a three-layer structure composed of a depletion layer (or I layer), a P layer (anode) disposed on the incident plane side, and an N layer (cathode) disposed on the opposite side of the P layer (anode), the depletion layer being sandwiched between the P layer and the N layer. In order to detect the radiation, a reverse voltage is applied between the P layer and the I layer (depletion layer). The material and thickness of the detection unit cover 13 are selected in consideration of transmittance so that the energy characteristics of radiation measurement becomes flat in combination with the Si-PIN semiconductor detector.

The measurement unit 2 is provided with a signal processing section 21, a calculation section 22, a display section 23, a mode selection switch 24, an AC power source 25, and a circuit protector 26. The signal processing section 21 measures the radiation by being inputted with the detection signal outputted from the radiation detector 11. The calculation section 22 converts a measurement value thereof into an engineering value (counting rate, dose rate, or the like) as a radiation dose per unit time and provides an output. The display section 23 displays the radiation dose (engineering value) calculated by the calculation section 22.

The mode selection switch 24 switches between a normal mode in which normal measurement is performed and a check radiation source mode in which radiation for check is irradiated to the radiation detector 11. In the drawing, the mode selection switch 24 is set to the normal mode; and the shutter 124 is maintained in a closed state. The AC power source 25 supplies an alternating current (AC) voltage to the check radiation source irradiation section 12 of the detection unit 1 when the check radiation source mode is selected. The circuit protector detects an overcurrent of the check radiation source irradiation section 12 and interrupts an AC current that flows through the AC solenoid 125.

The detection unit 1 is connected to the measurement unit 2 by a composite cable 3 in order to perform remote operation from the measurement unit 2. The composite cable 3 has a detection signal cable 31 and a control cable 32. The detection signal outputted from the radiation detector 11 is transmitted to the measurement unit 2 through the detection signal cable 31. The AC voltage is applied from the AC power source 25 to the check radiation source irradiation section 12 via the circuit protector 26 of the measurement unit 2 through the control cable 32.

The check radiation source irradiation section 12 is provided with a check radiation source 121, a holder 122, a brace 123, a shutter 124, an AC solenoid 125, a spring 126, a temperature switch 127, and a resistor 128. The check radiation source 121 releases the radiation for check. The check radiation source 121 is attached to the holder 122. The brace 123 fixes the holder 122. The shutter 124 is disposed between the radiation detector 11 and the check radiation source 121 (and the holder 122) and, for example, moves up and down.

The AC solenoid 125 is operated by the AC power source and is remotely operated by the operation of the mode selection switch 24 of the measurement unit 2 to open or close the shutter 124. The spring 126 restores the opened shutter 124 to be closed. The temperature switch 127 is closely fixed to the AC solenoid 125; and a contact of the temperature switch 127 is reversed from an opened state to a closed state by the principle of bimetal when the temperature switch 127 reaches a temperature equal to or more than a set value. The resistor 128 is connected in series to the temperature switch 127.

In the check radiation source mode, the shutter 124 is kept in an opened state to irradiate the radiation for check of the check radiation source 121 to the radiation detector 11. In the normal mode, the shutter 124 is kept in a closed state to shield the check radiation source 121 against the radiation detector 11. The shutter 124 absorbs beta-rays (β-rays), thereby blocking the irradiation of the radiation for check to the radiation detector 11. There can be applied strontium-90 (Sr-90) whose half-life period is long _28.8 years as a nuclide of the check radiation source 121, and which is a β-ray source that is easy to be shielded. The Sr-90 is easy to be obtained and energy of β-rays of yttrium-90 (Y-90) that is radiative equilibrium is large __ 2.28 MeV.

The shutter 124 is several mm in thickness and substantially absorbs braking X-rays to be radiated with the absorption of β-rays. When the shutter 124 is opened and the β-rays are directly made incident on a ceramic substrate on the back side of a Si semiconductor detector, the β-rays are absorbed by the ceramic substrate. The braking X-rays associated with the absorption thereof acts on the depletion layer of the Si semiconductor detector to serve as the check radiation source mode. As for the circuit protector 26, subdivided rating protectors are commercially available and therefore a desired protector can be obtained in accordance with a rated current of the AC solenoid 125.

The AC solenoid 125 is composed of a plunger 1251 and a coil 1252. When the AC voltage is supplied from the AC power source 25 to the AC solenoid 125, the built-in coil 1252 is excited. When the plunger 1251 of the AC solenoid 125 is suctioned against the spring 126, the shutter 124 is reversed from the closed state to the opened state. When it becomes a state where the plunger 1251 is not suctioned to a predetermined position due to stuck dust or the like during operation and is caught halfway, an overcurrent flows through the AC solenoid 125 and the AC solenoid 125 abnormally generates heat. When the temperature switch 127 closely fitted to the AC solenoid 125 reaches a set temperature or more, the contact of the temperature switch 127 is reversed from the opened state to the closed state.

The contact of the temperature switch 127 is connected in series to the resistor 128; and the series connection is connected in parallel to the coil 1252 of the AC solenoid 125. The contact of the temperature switch 127 is reversed from the opened state to the closed state; and thus, an overcurrent flows through an internal coil 261 of the circuit protector 26 of the measurement unit 2. Therefore, an internal contact 262 connected in series to the internal coil 261 is tripped and is self-maintained in its state to interrupt the AC current to be flown to the AC solenoid 125.

The circuit protector 26 has characteristics in which tripping operation of the contact becomes faster with an increase in transient current equal to or more than the rated current; and there is selected a circuit protector having a rated current, which is not operated by the transient current during the operation of the AC solenoid 125. Generally, the circuit protector 26 is selected in conformity with the rated current of the AC solenoid 125 so as not to exceed the rated current.

The temperature switch 127 is set to the rated temperature of the AC solenoid 125 in operation temperature. When the normal upper limit environmental temperature of the detection unit 1 is represented by T1, the upper limit environmental temperature during a fault by T2, the rated temperature of the AC solenoid 125 by T3, and a normal temperature rise value of the AC solenoid 125 by ΔT, a solenoid assumed to be $T3>T1+\Delta T$ is selected as the AC solenoid 125.

It is premised that an environmental temperature T of the detection unit 1 during a fault cannot be actually grasped and temperature measurement is not performed. Even when the check radiation source mode is selected during the fault by protecting the AC solenoid 125 by this manner, inspection can be performed if $T3>T+\Delta T$ is established. Furthermore, if $T3\leq T+\Delta T$ is established with respect to the environmental temperature T, the circuit protector 26 is automatically opened to protect the AC solenoid 125.

The AC solenoid 125 is protected by constituting in the manner described above; and therefore, even in a state where the environmental temperature of the detection unit 1 during the fault cannot be grasped, the temperature switch 127 automatically determines the propriety of the selection of the check radiation source mode. When the determination of the check radiation source mode is possible, soundness of the radiation monitor can be confirmed even during the fault. When the determination of the check radiation source mode is impossible, the circuit protector 26 is made to operate to protect and automatically restore the AC solenoid 125 to be in a measurement state.

In temperature circumstances during the fault, it is assumed that the AC solenoid 125 is burnt out by the operation of the check radiation source mode. As a result of burnout, if the check radiation source stops halfway of movement and does not move, a state where the shutter 124 cannot be restored to the measurement state is likely to be occurred. Such a state can be avoided by the configuration of Embodiment 1; and therefore, there can be provided a highly reliable radiation monitor through during the normal time and during the fault.

The radiation monitor according to this embodiment includes the detection unit and the measurement unit. The detection unit has: the radiation detector which detects the radiation and outputs the detection signal; and check radiation source irradiation means which irradiates the radiation for inspection to the radiation detector by remote operation.

The measurement unit has: the signal processing section which measures the radiation by being inputted with the detector signal; the calculation section which converts the measurement value thereof into the engineering value as the radiation dose per unit time and provides the output; the display section which displays the engineering value; mode selection means which performs selective operation between the normal mode in which normal measurement is performed and the check radiation source mode in which measurement is performed in the state where the radiation for inspection is irradiated to the radiation detector; and overcurrent protection means which performs overcurrent protection of the check radiation source irradiation section.

The check radiation source irradiation means has: the check radiation source which radiates the radiation for inspection; shield means which shields the radiation for inspection during the normal mode; the AC solenoid which moves the shield means or the check radiation source so that the radiation for inspection is irradiated to the radiation detector during the check radiation source mode; the temperature switch which is closely attached to the AC solenoid and whose contact is reversed when the temperature switch reaches the set temperature or more; and the resistor connected in series to the contact of the temperature switch.

The overcurrent protection means interrupts a current by the contact having characteristics in which tripping operation becomes faster with an increase in transient current and mechanically self-maintains its state. The contact of the temperature switch is connected in series to the resistor and the series connection is connected in parallel to the AC solenoid; and when the temperature switch reaches the set temperature or more, the contact of the overcurrent protection means is tripped by intentionally flowing a current suppressed by the resistor.

Embodiment 2

Incidentally, the detection unit 1 according to Embodiment 1 is, for example, the configuration corresponding to the case whose measurement object is the environmental radiation. The check radiation source irradiation section 12 fixes the holder 122 attached with the check radiation source 121 to the brace 123 and shields the check radiation source 121 by the shutter 124 disposed between the radiation detector 11 and the holder 122. Opening or closing of the shutter 124 is performed by remote operation from the measurement unit 2.

Figure 2:
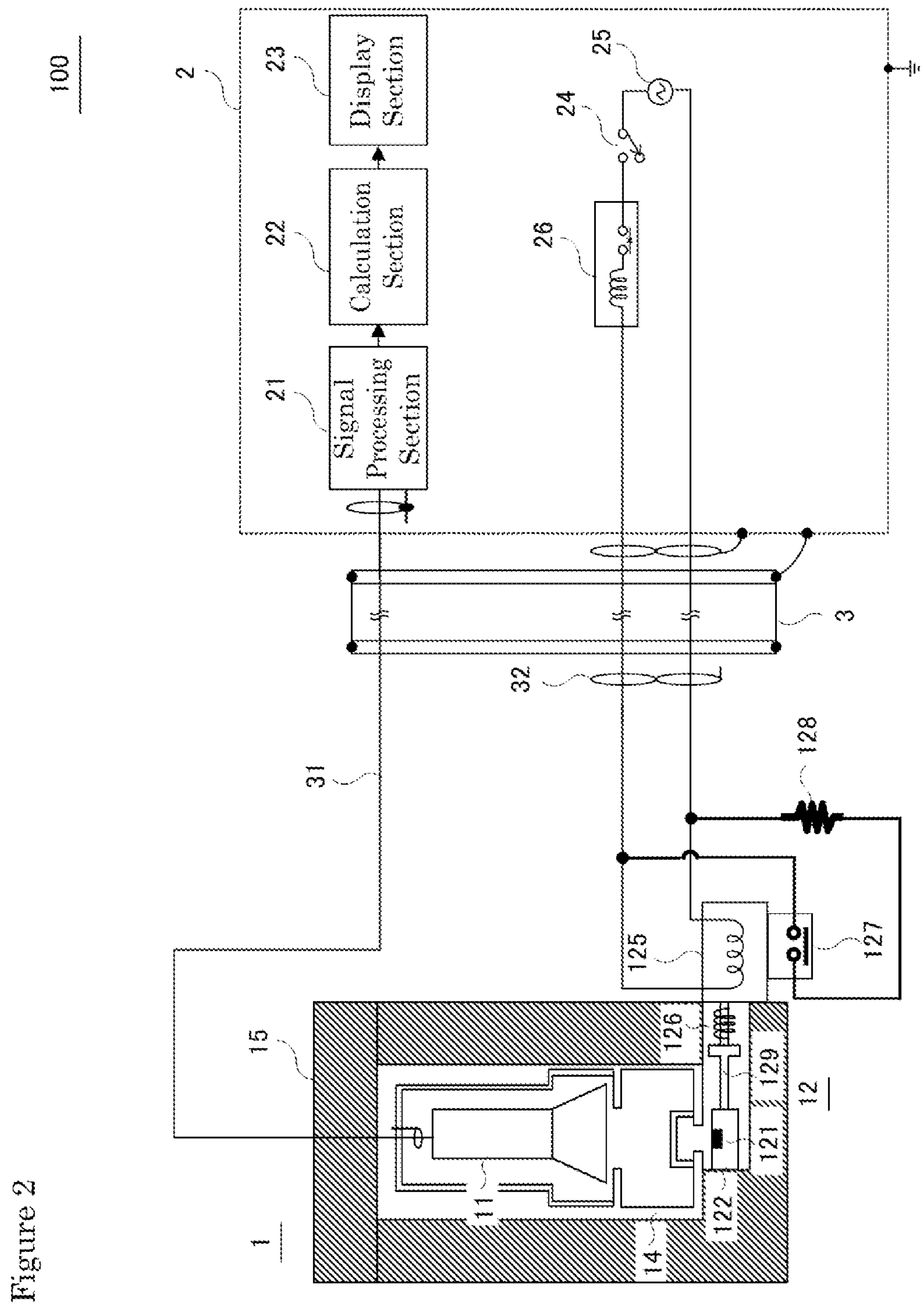
FIG. 2 is a block diagram showing a radiation monitor according to Embodiment 2 of the present invention.

The configuration of a radiation monitor according to Embodiment 2 is shown in FIG. 2. In this embodiment, a detection unit 1 has a configuration corresponding to a case whose measurement object is, for example, a sampled sampling gas. The detection unit 1 includes: a sample vessel 14; a radiation detector 11; and a shield body 15. The sample vessel 14 defines the volume of the sampling gas to be measured. The radiation detector 11 detects radiation released from gaseous radioactive materials contained in the sampling gas of the volume defined by the sample vessel 14.

The shield body 15 envelopes the radiation detector 11 and the sample vessel 14 to shield from environmental radiation.

The check radiation source irradiation section 12 is composed of a check radiation source 121, a holder 122, an AC solenoid 125, and the like. The check radiation source 121 is attached to the holder 122. The holder 122 is fixed to a leading end of a brace bar 129. The brace bar 129 is coupled to a plunger of the AC solenoid 125. The check radiation source 121 moves or reciprocates between a facing position and a shield position by the operation of the AC solenoid 125. In FIG. 2, the check radiation source 121 is set at the facing position and the check radiation source 121 faces the radiation detector 11 (a normal mode state).

Figure 3:
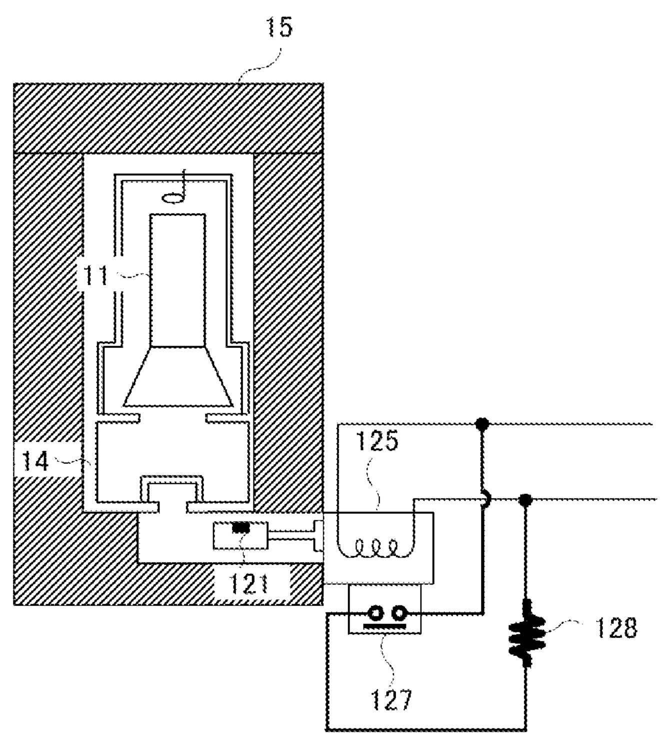
FIG. 3 is a block diagram showing a shield position in the present invention.

An operation state of the AC solenoid 125 is set by a mode selection switch 24 of the measurement unit 2. In a check radiation source mode state, the brace bar 129 is made to move so that the check radiation source 121 faces the radiation detector 11 with the sample vessel 14 being sandwiched therebetween to irradiate the radiation for check to the radiation detector 11. In the normal mode state, the brace bar 129 is made to move so that the check radiation source 121 is hidden behind the shield body 15 by a return of the spring 126. In FIG. 3, the check radiation source 121 is set to the shield position.

The radiation monitor according to Embodiment 2 performs similar operation by the configuration similar to that of Embodiment 1. As a result, in the radiation monitor according to this embodiment, the AC solenoid 125 can be surely protected during the fault as in Embodiment 1; and therefore, reliability of the radiation monitor is improved.

Embodiment 3

Incidentally, in Embodiment 1 and Embodiment 2, the check radiation source irradiation section 12 has the resistor 128 connected in series to the temperature switch 127. The resistor 128 is connected in parallel to the coil of the AC solenoid and the contact of the temperature switch 127 is reversed from opening to closing; and accordingly, an overcurrent flows through the internal coil of the circuit protector 26 of the measurement unit 2. The internal contact connected in series to the internal coil is moved from closing to opening and is mechanically maintained in its state to interrupt the current.

Figure 4:
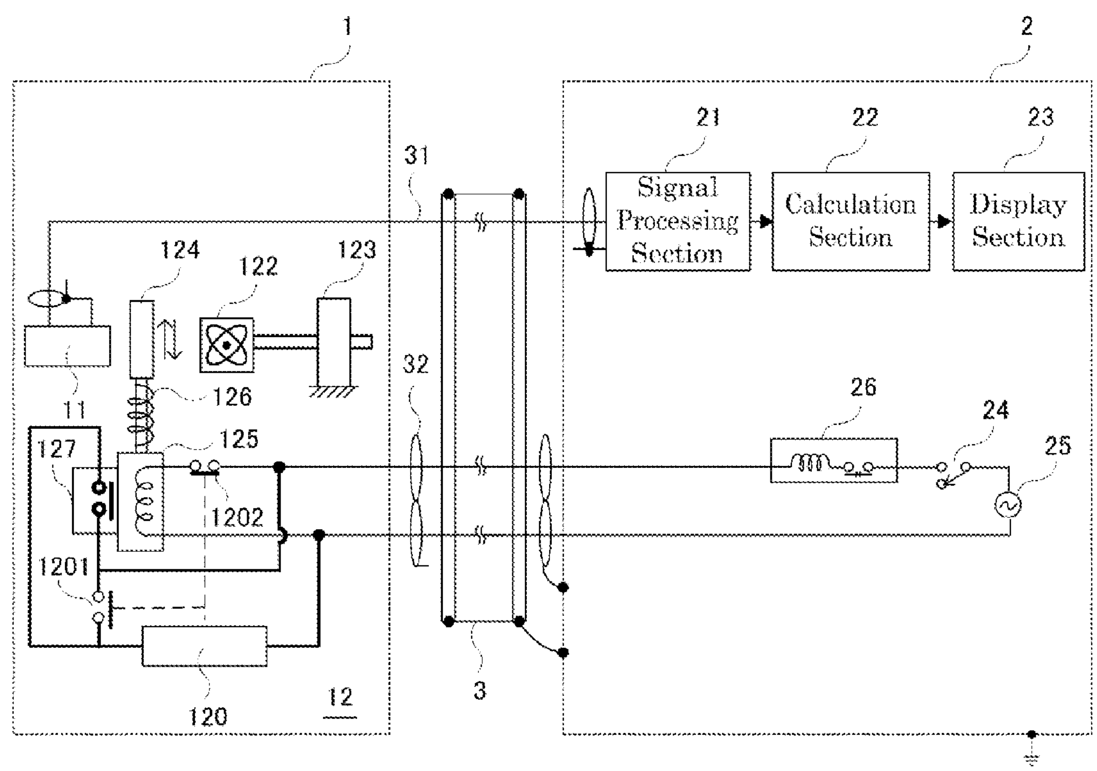
FIG. 4 is a block diagram showing a radiation monitor according to Embodiment 3 of the present invention.

The configuration of a radiation monitor according to Embodiment 3 is shown in FIG. 4. In this Embodiment, a check radiation source irradiation section 12 of a detection unit 1 has a relay 120 that operates as a load of a temperature switch 127. The relay 120 has a first contact 1201 and a second contact 1202. The first contact 1201 of the relay 120 is connected in parallel to the contact of the temperature switch 127 and the relay 120 is excited if the contact of the temperature switch 127 is reversed from opening to closing. The second contact 1202 of the relay 120 is connected in series to the AC solenoid 125.

The relay 120 operates such that the first contact 1201 is made to reverse from opening to closing to self-maintain an excitation state and the second contact 1202 is made to reverse from closing to opening to interrupt a current of an AC solenoid 125. Self-maintaining of the relay 120 of the check radiation source irradiation section 12 is released by only returning a mode selection switch 24 from a check radiation source mode to a normal mode.

By being configured as described above, the AC solenoid 125 is surely protected through during a normal time and during a fault; and therefore, as in Embodiment 1 and Embodiment 2, reliability of the radiation monitor can be improved by surely protecting the AC solenoid 125 during the fault. Furthermore, as described in Embodiment 1 and Embodiment 2, a circuit protector 26 is made to forcibly trip during the operation of the temperature switch 127; and therefore, although instantaneous, a simulated short-circuit current suppressed by the resistor 128 does not need to be flown to a control cable 32 that constitutes a composite cable 3 and thus a higher reliable radiation monitor can be provided.

The radiation monitor according to this embodiment includes the detection unit and the measurement unit. The detection unit has: a radiation detector which detects radiation and outputs a detection signal; and check radiation source irradiation means which irradiates radiation for inspection to the radiation detector by remote operation.

The measurement unit has: a signal processing section which measures the radiation by being inputted with the detector signal; a calculation section which converts a measurement value thereof into an engineering value as a radiation dose per unit time and provides an output; a display section which displays the engineering value; mode selection means which performs selective operation between the normal mode in which normal measurement is performed and the check radiation source mode in which measurement is performed in a state where the radiation for inspection is irradiated to the radiation detector; and overcurrent protection means which performs overcurrent protection of the check radiation source irradiation section.

The check radiation source irradiation means has: a check radiation source which radiates the radiation for inspection; shield means which shields the radiation for inspection during the normal mode; the AC solenoid which moves the shield means or the check radiation source so that the radiation for inspection is irradiated to the radiation detector during the check radiation source mode; the temperature switch which is closely attached to the AC solenoid and whose contact is reversed when the temperature switch reaches the set temperature or more; and the relay to be operated by the reversal of the contact of the temperature switch.

The overcurrent protection means interrupts a current by a contact having characteristics in which tripping operation becomes faster with an increase in overcurrent and mechanically self-maintains its state. The contact of the temperature switch is connected in series to the relay; and the contact of the temperature switch is reversed when the temperature switch reaches the set temperature or more. It is characterized in that, according to this, the relay operates and is self-maintained by its contact and the current of the AC solenoid is interrupted by another contact.

Embodiment 4

Figure 5:
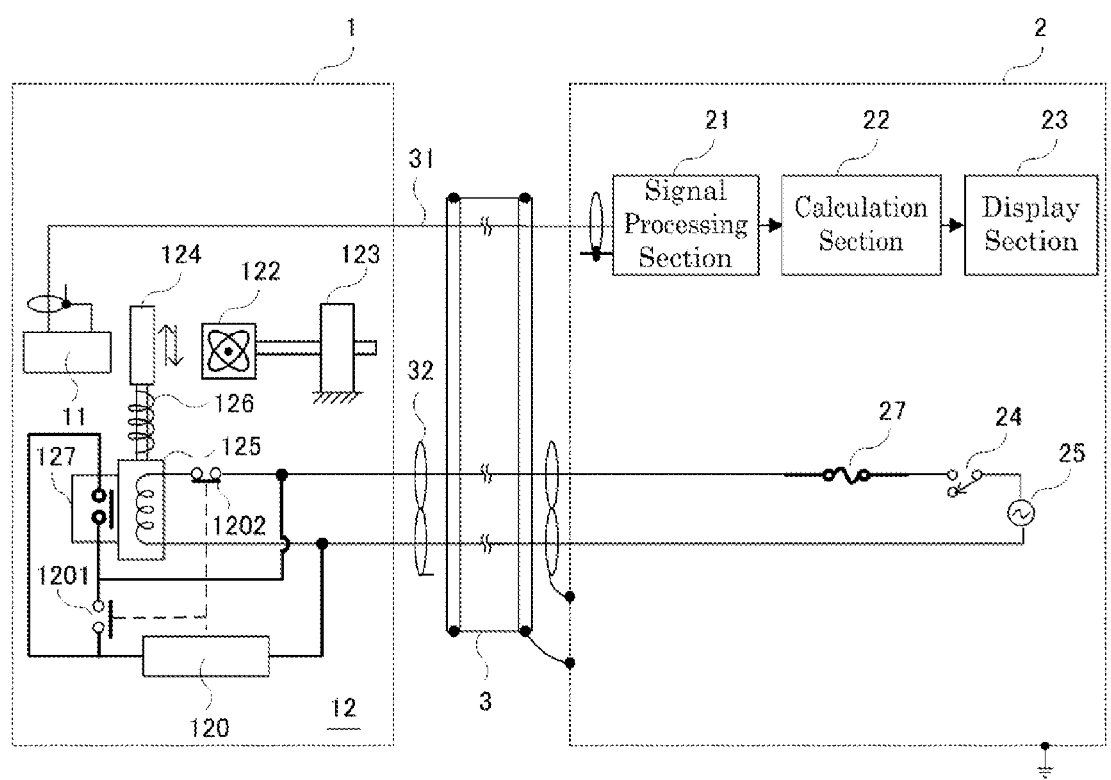
FIG. 5 is a block diagram showing a radiation monitor according to Embodiment 4 of the present invention.

The configuration of a radiation monitor according to Embodiment 4 is shown in FIG. 5. This embodiment is based on an idea in which overcurrent protection including rated temperature control of an AC solenoid and short circuit protection of a check radiation source irradiation section line are separately treated. In a measurement unit 2, the circuit protector 26 of Embodiment 3 is replaced with a fuse 27 to save a space; and therefore, the measurement unit can be reduced in size. More specifically, it is characterized in that the radiation monitor according to this embodiment is provided with the fuse as overcurrent protection means.

Embodiment 5

Figure 6:
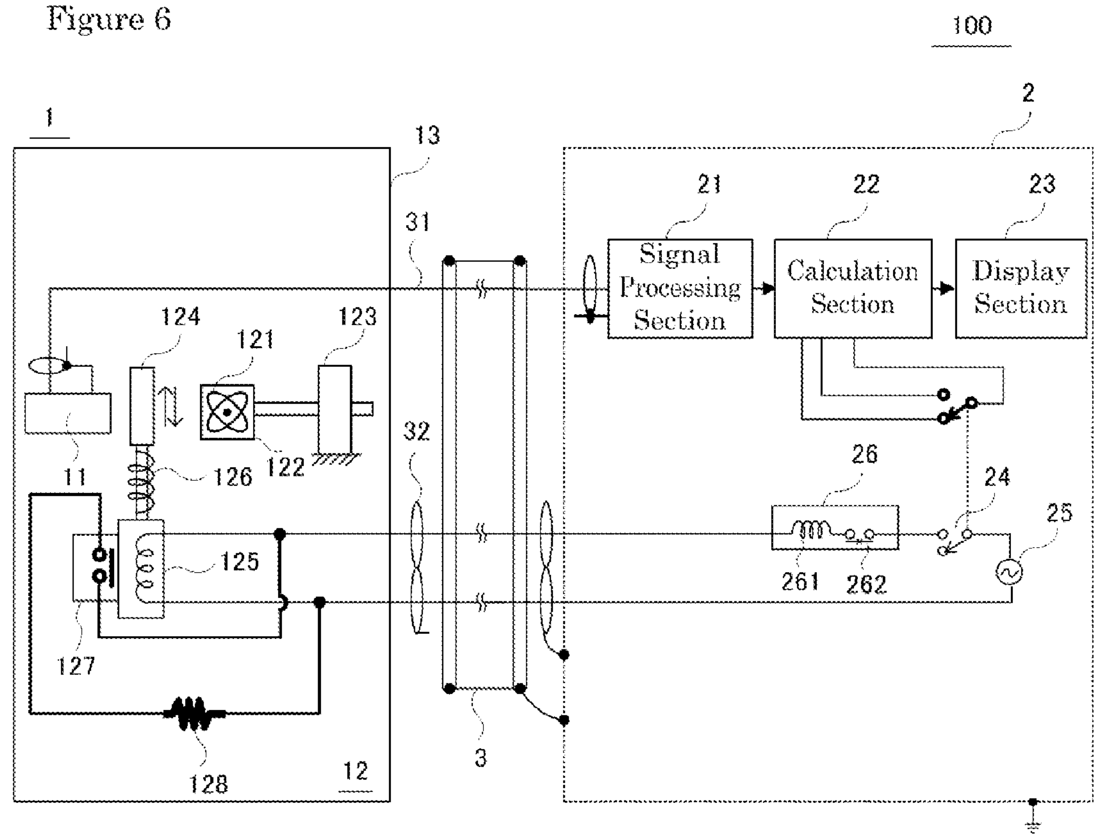
FIG. 6 is a block diagram showing a radiation monitor according to Embodiment 5 of the present invention.

The configuration of a radiation monitor according to Embodiment 5 is shown in FIG. 6. In this embodiment, a mode selection switch 24 of a measurement unit 2 is a two-step structure. A calculation section 22 fetches selection mode information for each calculation period and arranges latest engineering value data of a set calculation periodic number in temporal sequence to update the engineering value data for each calculation period. In a normal mode, Qs pieces of set normal mode engineering value data rows are updated and stored. Furthermore, in a check radiation source mode, Ws pieces of set check radiation source engineering value data rows are updated and stored.

Figure 8:
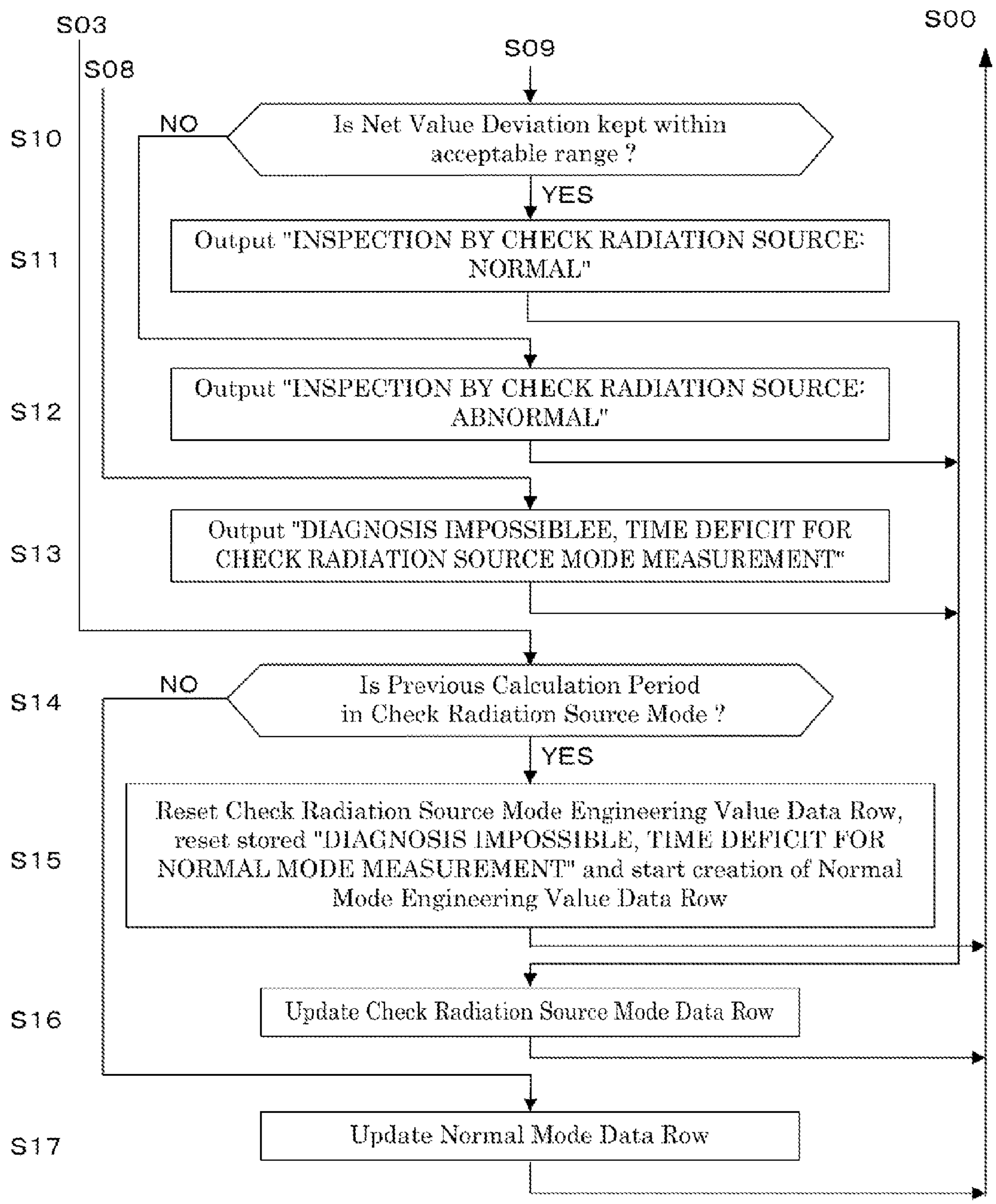
FIG. 8 is a chart showing ST10 to ST17 of the operational flows according to Embodiment 5.

In the measurement unit 2, when the mode selection switch 24 is switched from the normal mode to the check radiation source mode, the calculation section 22 calculates a net value of a check radiation source based on a latest normal mode engineering value and a subsequent latest check radiation source engineering value, determines whether or not the net value is kept within an acceptable value, and provides an output, the values being set by operational flows shown in FIG. 7 and FIG. 8. FIG. 7 shows ST00 to ST09 of the operational flows. FIG. 8 shows ST10 to ST17 of the operational flows.

In the calculation section 22, a measurement value is read from the signal processing section 21 in Step S01; and in Step S02, the measurement value is converted into an engineering value to be outputted. In Step S03, a determination is made whether or not the present calculation period is in the check radiation source mode; and if the determination is YES, a determination is made whether or not the previous calculation period is in the normal mode in Step S04. If the selection mode is reversed from the normal mode to the check radiation source mode and the determination in Step S04 is YES, a determination is made whether or not the number of data of the normal mode engineering value data row is equal to Ps, the set number of data, in Step S05.

If the determination in Step S05 is YES, an average value M(N) as for Ps-pieces of data of the normal mode engineering value data row is calculated and stored, the data row concerned is reset, and creation of the check radiation source mode engineering value data row is started at the next calculation period in Step S06; and then the processing is returned to Step S01. If the determination in Step S05 is NO, a message of "DIAGNOSIS IMPOSSIBLE, TIME DEFICIT FOR NORMAL MODE MEASUREMENT" is outputted, the normal mode engineering value data row is reset, and creation of the check radiation source mode engineering value data row is started at the next calculation period in Step S07; and then the processing is returned to Step S01. The message is stored until being reset by switching modes and is outputted for each calculation period.

If the determination in Step S04 is NO, a determination is made whether or not the number of data of the check radiation source mode engineering value data row is equal to Us, the set number of data, in Step S08; and if the determination is YES, an average value M(C) averaged as for Us-pieces of data of the check radiation source mode engineering value data row is calculated and a net value deviation is calculated by the following equation in Step S09.

$$\text{Net value deviation}=[M(C)-M(N)/\text{standard check radiation source net engineering value}]-1$$

Further, in the calculation section 22, a determination is made whether or not the net value deviation is kept within an acceptable range in Step S10. If the determination is YES, a message of "INSPECTION BY CHECK RADIATION SOURCE: NORMAL" is outputted in Step S11; and in Step S16, the check radiation source mode data row is updated and then the processing is returned to Step S01. If the determination in Step S10 is NO, a message of "INSPECTION BY CHECK RADIATION SOURCE: ABNORMAL" is outputted in Step S12; and then the processing is proceeded to Step S16. If the determination in Step S08 is NO, a message of "DIAGNOSIS IMPOSSIBLE, TIME DEFICIT FOR NORMAL MODE MEASUREMENT" is outputted in Step S13; and then the processing is proceeded to Step S16.

If the determination in Step S03 is NO, a determination is made whether or not the previous calculation period is in the check radiation source mode in Step S14. If the selection mode is reversed from the check radiation source mode to the normal mode and the determination in Step S14 is YES, the check radiation source mode engineering value data row is reset, a reset is performed if there stores a message of "DIAGNOSIS IMPOSSIBLE, TIME DEFICIT FOR NORMAL MODE MEASUREMENT" and creation of the normal mode engineering value data row is started in Step S15; and then the processing is returned to Step S01.

If the determination in Step S14 is NO, the normal mode data row is updated in Step S17; and then the processing is returned to Step S01. The measurement unit 2 automatically evaluates the results inspected by the check radiation source in such a procedure; and therefore, effective and highly reliable inspection can be performed.

The radiation monitor according to this embodiment is characterized in that if the selection mode is switched from the normal mode to the check radiation source mode, the calculation section calculates the net measurement value of the check radiation source based on the set latest normal mode measurement value and the subsequent latest check radiation source measurement value, determines whether or not the net measurement value is kept within the acceptable value, and provides the output.

Incidentally, the present invention can freely combine the respective embodiments and appropriately change and/or omit the respective embodiments, within the scope of the present invention.

DESCRIPTION OF REFERENCE NUMERALS

Detection unit; 11 Radiation detector; 12 Check radiation source irradiation section; 120 Relay; 1201 First contact; 1202 Second contact; 121 Check radiation source; 122 Holder; 123 Brace; 124 Shutter; 125 AC solenoid; 126 Spring; 127 Temperature switch; 128 Resistor; 129 Brace bar; 13 Detection unit cover; 14 Sample vessel; 15 Shield body; 2 Measurement unit; 21 Signal processing section; 22 Calculation section; 23 Display section; 24 Mode selection switch; 25 AC power source; 26 Circuit protector; 27 Fuse; 3 Composite cable; 31 Detection signal cable; 32 Control cable; 100 Radiation monitor

The invention claimed is:

1. A radiation monitor comprising:

a shutter installed between a check radiation source and a radiation detector;

a calculation section which calculates a radiation dose from a detection signal outputted by said radiation detector;

an AC solenoid to be operated by an AC power source;

a temperature switch which is attached to said AC solenoid and whose contact is reversed from an opened state to a closed state when temperature thereof is equal to or more than a set value;

a circuit protector which has a contact and is connected in series to said AC solenoid; and a mode selection switch connected in series to said AC solenoid, wherein said shutter is maintained in a closed state when said mode selection switch is set to a normal mode;

said mode selection switch is changed from the normal mode to a check radiation source mode, thereby flowing an AC current through said AC solenoid to change said shutter from the closed state to an opened state; and the contact of said temperature switch is reversed from the opened state to the closed state, thereby disconnecting the contact of said circuit protector to interrupt the AC current that flows through said AC solenoid.

2. The radiation monitor according to claim 1, further comprising a relay which has a first contact and a second contact and is disposed in series to said temperature switch, the first contact being connected in parallel to said temperature switch, and the second contact being connected in series to said AC solenoid.

3. The radiation monitor according to claim 1, wherein said calculation section calculates a net value deviation of said check radiation source when setting of said mode selection switch is changed from the normal mode to the check radiation source mode.

4. The radiation monitor according to claim 3, wherein said calculation section determines that said check radiation source is normal if the calculated net value deviation is kept within an acceptable range, and determines that said check radiation source is abnormal if the calculated net value deviation is out of the acceptable range.

5. A radiation monitor comprising:

a check radiation source which moves between a facing position and a shield position;

a radiation detector which outputs a detection signal when radiation is made incident;

a calculation section which calculates a radiation dose from the detection signal outputted by said radiation detector;

an AC solenoid to be operated by an AC power source;

a temperature switch which is attached to said AC solenoid and whose contact is reversed from an opened state to a closed state when temperature thereof is equal to or more than a set value;

a circuit protector which has a contact and is connected in series to said AC solenoid; and a mode selection switch connected in series to said AC solenoid, wherein said check radiation source is maintained at the shield position when said mode selection switch is set to a normal mode;

said mode selection switch is changed from the normal mode to a check radiation source mode, thereby flowing an AC current through said AC solenoid to move said check radiation source from the shield position to the facing position; and the contact of said temperature switch is reversed from the opened state to the closed state, thereby disconnecting the contact of said circuit protector to interrupt the AC current that flows through said AC solenoid.

6. The radiation monitor according to claim 5, further comprising a relay which has a first contact and a second contact and is disposed in series to said temperature switch, the first contact being connected in parallel to said temperature switch, and the second contact being connected in series to said AC solenoid.

7. The radiation monitor according to claim 5, wherein said calculation section calculates a net value deviation of said check radiation source when setting of said mode selection switch is changed from the normal mode to the check radiation source mode.

8. The radiation monitor according to claim 7, wherein said calculation section determines that said check radiation source is normal if the calculated net value deviation is kept within an acceptable range, and determines that said check radiation source is abnormal if the calculated net value deviation is out of the acceptable range.

9. A radiation monitor comprising:

a shutter installed between a check radiation source and a radiation detector;

a calculation section which calculates a radiation dose from a detection signal outputted by said radiation detector;

an AC solenoid to be operated by an AC power source;

a temperature switch which is attached to said AC solenoid and whose contact is reversed from an opened state to a closed state when temperature thereof is equal to or more than a set value;

a fuse connected in series to said AC solenoid; and a mode selection switch connected in series to said AC solenoid, wherein said shutter is maintained in a closed state when said mode selection switch is set to a normal mode;

said mode selection switch is changed from the normal mode to a check radiation source mode, thereby flowing an AC current through said AC solenoid to change said shutter from the closed state to an opened state; and the contact of said temperature switch is reversed from the opened state to the closed state, thereby fusing said fuse to interrupt the AC current that flows through said AC solenoid.

10. The radiation monitor according to claim 9, further comprising a relay which has a first contact and a second contact and is disposed in series to said temperature switch, the first contact being connected in parallel to said temperature switch, and the second contact being connected in series to said AC solenoid.

11. The radiation monitor according to claim 9, wherein said calculation section calculates a net value deviation of said check radiation source when setting of said mode selection switch is changed from the normal mode to the check radiation source mode.

12. The radiation monitor according to claim 11, wherein said calculation section determines that said check radiation source is normal if the calculated net value deviation is kept within an acceptable range, and determines that said check radiation source is abnormal if the calculated net value deviation is out of the acceptable range.

* * * * *